United States Patent [19]

Johannes et al.

[11] 4,204,567

[45] May 27, 1980

[54] TREAD STRUCTURE FOR PNEUMATIC VEHICLE TIRES

[75] Inventors: Günter Johannes; Hans-Dieter Pfeiffer, both of Garbsen, Fed. Rep. of Germany

[73] Assignee: Continental Gummi-Werke Aktiengesellschaft, Hanover, Fed. Rep. of Germany

[21] Appl. No.: 912,374

[22] Filed: Jun. 5, 1978

[30] Foreign Application Priority Data

Jun. 3, 1977 [DE] Fed. Rep. of Germany ... 7717524[U]

[51] Int. Cl.$^2$ ............................................. B60C 11/04
[52] U.S. Cl. .............................. 152/209 D; D12/142
[58] Field of Search ........ D90/20; 152/209 D, 209 R; D12/136, 138, 142, 146, 147

[56] References Cited

U.S. PATENT DOCUMENTS

| D. 82,867 | 12/1900 | Young | 152/209 D |
| D. 190,218 | 4/1961 | Mattingly | 152/209 D |

Primary Examiner—Richard A. Bertsch
Attorney, Agent, or Firm—Becker & Becker, Inc.

[57] ABSTRACT

A tread structure for pneumatic vehicle tires, according to which the tread is provided with a centrally arranged zigzag groove extending in the circumferential direction of the tire. The tread also has elevations or raised sections on both sides of the circumferential groove. The elevations follow one another in the circumferential direction of the tire, and are separated from one another by other grooves, including grooves which start from the zigzag central circumferential groove and extend straight towards both tire shoulders. Of these straight grooves, those which follow one another in the circumferential direction of the tire are slanted in opposite directions with regard to the circumferential or transverse direction of the tire.

7 Claims, 1 Drawing Figure

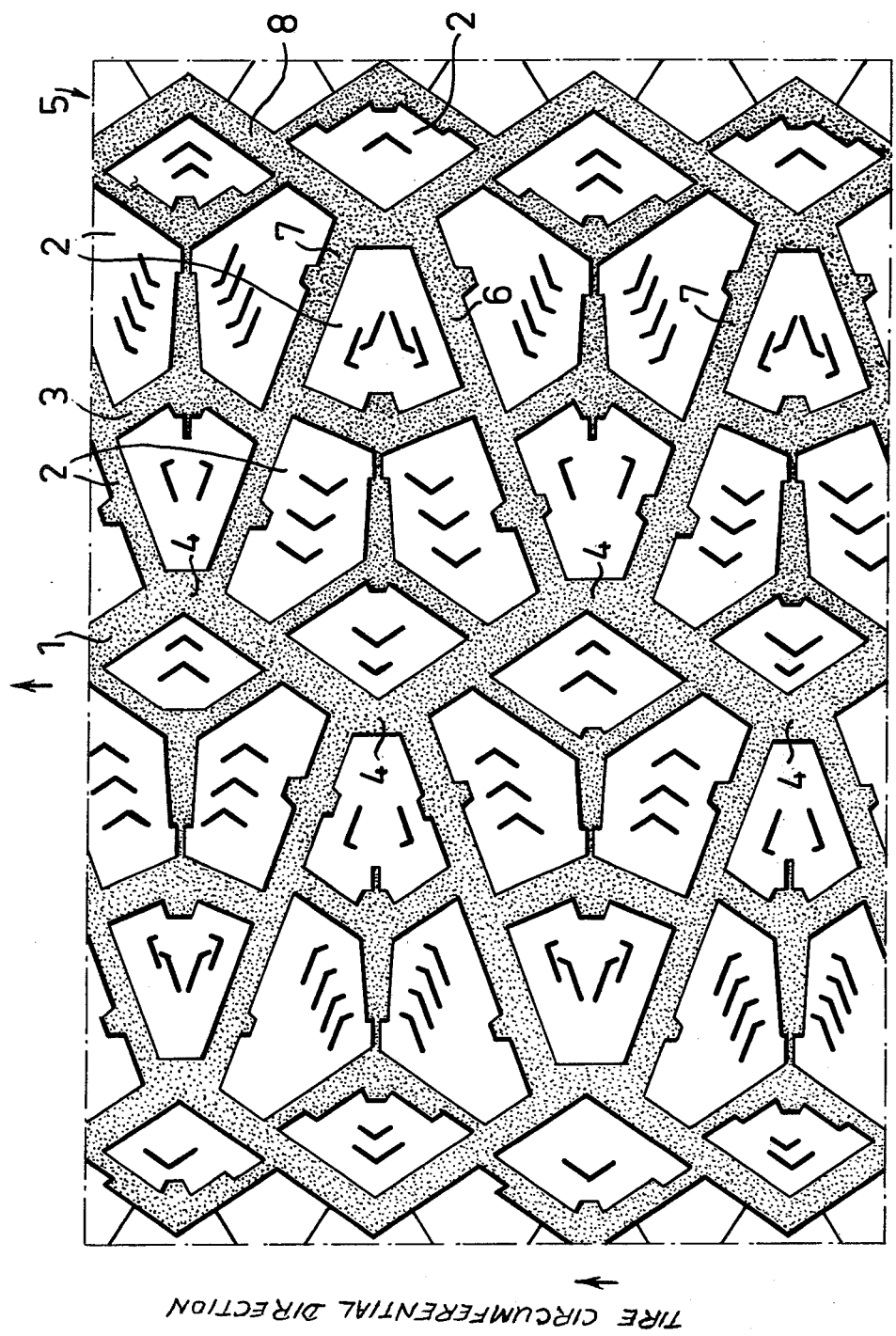

TREAD STRUCTURE FOR PNEUMATIC VEHICLE TIRES

The present invention relates to a tread structure for pneumatic vehicle tires, according to which the tread is provided with a centrally arranged zigzag groove extending in the circumferential direction of the tire. The tread also has elevations or raised sections on both sides of the circumferential groove. The elevations follow one another in the circumferential direction of the tire, and are separated from one another by other grooves.

It is essentially an object of the present invention to bring about a particularly effective water removal from the respective portion of the tread in contact with the ground, while obtaining a favorable noise level and a small and uniform tread wear.

This object and other objects and advantages of the present invention will appear more clearly from the following specification in connection with the accompanying drawing, which shows a partial top view of the pneumatic vehicle tire tread according to the present invention.

The tread of the present invention is characterized primarily in that, starting from the central zigzag circumferential groove, grooves extend straight towards both tire shoulders. Of these grooves, those which follow one another in the circumferential direction of the tire are slanted from the circumferential direction of the tire in opposite directions. Expediently, these oppositely directed slanted grooves essentially start from the apexes of the centrally arranged zigzag lines which form the above mentioned circumferential groove.

This oppositely oriented arrangement of the grooves has the advantage that the rolling-off noise remains small and that a uniform tread wear occurs. At the same time, a rapid carrying-off of water from the inside toward the outside will be assured.

Referring now to the drawing in detail, the tread has a centrally arranged groove 1 extending in the circumferential direction of the tire, which groove follows a zigzag course. Elevations or raised sections 2 are located on both sides of this circumferential groove 1 and are separated from one another by grooves 3, 6, and 7. It is important that grooves 6, 7 extend straight from the apexes 4 of the circumferential groove 1 toward both sides, the grooves 6,7 extending as far as the tire shoulder 5. Those grooves 6,7 which follow one another in the circumferential direction of the tire are respectively paired and define the elevations 2. The grooves 6,7 start from the apexes 4 and are symmetrically slanted and oppositely directed with regard to the transverse direction of the tire. Paired grooves 6,7 form an angle of about 40° with one another, resulting in a slope of about 20° to the transverse direction of the tire. Moreover, by means of zigzag grooves 8 located in the side portions of the tread, a tread element is formed from elevations 2 between two successive grooves 6,7. The tread element has a pentagon-like shape, the larger dimension of which is transverse to the circumferential direction of the tire. As noted above, this pentagon-like shape is split up by the elevations 2.

The present invention is, of course, in no way limited to the specific showing of the drawing, but also encompasses any modifications within the scope of the appended claims.

What we claim is:

1. A vehicle tire tread structure for pneumatic tires having a tread and shoulder regions adjacent to said tread, said tread structure comprising in combination a plurality of elevations, a centrally arranged first groove having apexes being provided in said tread and following a zigzag course in the circumferential direction of said tire, said elevations being provided on both sides of said zigzag first groove and following one another in the circumferential direction of said tire, groove means being provided in said tread for separating said elevations from one another, said groove means including second grooves which start from both sides of said zigzag first groove and extend laterally straight outwardly respectively towards said tire shoulder regions, each two succeeding straight second grooves being slanted differently in opposite directions with regard to the transverse direction of said tire.

2. A tread structure in combination according to claim 1, in which each two succeeding second grooves essentially start from an apex of said zigzag first groove.

3. A tread structure in combination according to claim 2, in which each two succeeding second grooves define with said zigzag first groove and two zigzag third grooves respectively located in the side portions of said tread, an approximately pentagon-shaped tread section having a greater dimension in the transverse direction of said tire than in the circumferential direction of said tire.

4. A tread structure in combination according to claim 3, in which said groove means also includes fourth grooves which divide said pentagon-shaped tread sections into several elevations.

5. A tread structure in combination according to claim 2, in which each two succeeding second grooves start from an apex of said zigzag first groove located on the same half of said groove as the pertaining second grooves.

6. A tread structure in combination according to claim 2, in which each two succeeding second grooves slant symmetrically with regard to the transverse direction of said tire, said grooves forming at each apex of said zigzag first groove an angle of about 30° to 50° with one another.

7. A tread structure in combination according to claim 6, in which said angle is 40°.

* * * * *